United States Patent
Martin et al.

(10) Patent No.: US 7,244,350 B2
(45) Date of Patent: Jul. 17, 2007

(54) PROCESS TO PREPARE A HYDROCARBON PRODUCT HAVING A SULPHUR CONTENT BELOW 0.05 WT

(75) Inventors: Bernard Martin, Petit Couronne (FR); Jean-Luc Christian Rouby, Amsterdam (NL); Wouter Frederik Timmermans, The Hague (NL); Frederic Viel, Amsterdam (NL)

(73) Assignee: Shell Oil Company, Houston, TX (US)

( * ) Notice: Subject to any disclaimer, the term of this patent is extended or adjusted under 35 U.S.C. 154(b) by 422 days.

(21) Appl. No.: 10/485,872
(22) PCT Filed: Aug. 6, 2002
(86) PCT No.: PCT/EP02/08807

§ 371 (c)(1), (2), (4) Date: Feb. 5, 2004

(87) PCT Pub. No.: WO03/014264

PCT Pub. Date: Feb. 20, 2003

(65) Prior Publication Data

US 2004/0232050 A1 Nov. 25, 2004

(30) Foreign Application Priority Data

Aug. 8, 2001 (EP) .................................. 01402144

(51) Int. Cl.
*C10G 45/00* (2006.01)
(52) U.S. Cl. ........................... 208/209; 208/18; 208/80; 208/211; 208/213; 502/314
(58) Field of Classification Search .................. 208/18, 208/209, 211, 213, 80; 502/314
See application file for complete search history.

(56) References Cited

U.S. PATENT DOCUMENTS 5,292,428 A    3/1994   Harrison et al.

(Continued)

FOREIGN PATENT DOCUMENTS

EP    0316656    5/1989

(Continued)

OTHER PUBLICATIONS

International Search Reported mailed Dec. 13, 2002.
Van Looij F, et al Key parameters in deep hydrodesulfurization of diesel fuel , Applied Catalysis A: General, vol. 170, No. 1, May 1998 p. 1-12.

(Continued)

*Primary Examiner*—Glenn Caldarola
*Assistant Examiner*—Prem C. Singh
(74) *Attorney, Agent, or Firm*—William E. Hickman

(57) ABSTRACT

A process to continuously prepare a hydrocarbon product having a specified desired sulphur content lower than 0.05 wt %, starting from at least two or more high-sulphur hydrocarbon feedstocks having a sulphur content of above 0.05 wt %, by
(a) blending the two or more of the high-sulphur hydrocarbon feedstocks, to form a blended feed mixture;
(b) reducing the sulphur content of the blended feed mixture in a hydrodesulphurisation (HDS) step;
(c) obtaining a hydrocarbon fraction, having a reduced sulphur content, comprising the effluent of step (b) and determining the sulphur content of the hydrocarbon fraction; and
(d) obtaining the final hydrocarbon product from the direct product of step (c) and adjusting the process to achieve that the sulphur content of the hydrocarbon product is close or equal to the desired sulphur content of the hydrocarbon product, wherein the production of the hydrocarbon product having the desired sulphur content is optimised by integrated control of the blending in step (a) and of the HDS unit operation in step (b), and wherein the sulphur content of the hydrocarbon fraction as determined in step (c) is taken into account.

32 Claims, 3 Drawing Sheets

U.S. PATENT DOCUMENTS

| | | | |
|---|---|---|---|
| 5,484,756 A * | 1/1996 | Isomae | 502/314 |
| 5,888,376 A | 3/1999 | Wittenbrink et al. | |
| 6,204,426 B1 | 3/2001 | Miller et al. | |
| 6,264,826 B1 * | 7/2001 | Xiao et al. | 208/18 |

FOREIGN PATENT DOCUMENTS

| | | |
|---|---|---|
| EP | 0555216 | 1/2001 |
| EP | 01101813 | 5/2001 |
| EP | 0583826 | 2/2002 |
| GB | 2303918 | 1/1996 |
| WO | 01/11116 | 3/2000 |
| WO | 01/11117 | 3/2000 |
| WO | 00/20534 | 4/2000 |
| WO | 00/20535 | 4/2000 |
| WO | 00/29512 | 5/2000 |

OTHER PUBLICATIONS

Hydrocarbon Processing, Sep. 1999, pp. 122-123.

Riediger B: "Die Verarbeituing des Erdoles" 1971, Spring-Verlag, Berlin-Heidelberg, NY, p. 935-938, p. 962.

Handbook of Petroleum Refining Processes, Robert A. Meyers Editor-in-Chief, $2^{nd}$ edition, McGraw Hill, pp. 8.29-8.38, 1996.

Viel F., Hupkes W., "Inferring Measurement," Hydrocarbon Engineering, Apr. 2001, pp. 73-76.

Marquis, P. and J. Broustail (1988). "SMOC, a bridge between state space and model predictive controllers: application to the automation of hydrotreating unit." Proceedings of IFAC workshop on model based process control. Oxford: Pergamon Press. pp. 37-43, 1988.

Montgomery, D. and Peck, E. Linear Dynamic Model. "Introduction to linear regression analysis," $2^{nd}$ ed., John Wiley & Sons, 1992.

Poggio, T. and Girosi, F. "Network for approximation and learning." The proceedings of the IEEE, 78(9): pp. 1485-1497, Sep. 1990.

Jazwinski, A.H., "Stochastic Processes and Filtering Theory." Mathematics in Science and Engineering. (Academic Press), vol. 64, 1970.

* cited by examiner

PROCESS TO PREPARE A HYDROCARBON PRODUCT HAVING A SULPHUR CONTENT BELOW 0.05 WT

The present invention is related to a process to prepare a hydrocarbon product-having a sulphur content of below 0.05 wt % starting from two or more hydrocarbon feedstocks having a sulphur content of above 0.05 wt %, and optionally other feedstocks. The invention is especially related to a process wherein the hydrocarbon product is a gas oil (diesel) product Refinery processes are known wherein finished gas oil products are obtained by blending various hydrotreated and non-hydrotreated gas oil components as stored in storage vessels in a so-called gas oil-blending farm. The hydrotreated gas oil components are obtained by subjecting various sources of suitable hydrocarbon refinery streams having an elevated sulphur content to a hydrodesulphurization process unit (HDS) in order to reduce said sulphur content to a lower level. Examples of such refinery streams are kerosene fractions, straight run gas oil, vacuum gas oil, gas oil as obtained in a thermal cracking process and light and heavy cycle oil as obtained in a fluid catalytic cracking unit. An example of non-hydrotreated gas oil components, which are used in the blending process to prepare the finished gas oil, is the gas oil fraction as obtained in a fuels hydrocracker process.

In recent years the sulphur specification for gas oils has been reduced sharply because of environmental requirements. A further reduction of the specified sulphur levels is expected. It has been found that when such tighter sulphur specifications have to be met the above process to prepare on-spec gas oil is not adequately suited to maximise the gas oil production.

The object of the present invention is to provide for a process wherein the production of low sulphur gas oil in a refinery environment can be more easily maximised.

This object is achieved with the following process. Process to continuously prepare a hydrocarbon product having a desired sulphur content, which sulphur content is a specified value lower than 0.05 wt %, starting from at least two or more hydrocarbon feedstocks having a sulphur content of above 0.05 wt %, which process comprises the steps of (a) blending the two or more of the hydrocarbon feedstocks, having a sulphur content of above 0.05 wt %, to form a blended feed mixture,
(b) reducing the sulphur content of the blended feed mixture in a hydrodesulphurisation (HDS) step,
(c) obtaining a hydrocarbon fraction, having a reduced sulphur content, comprising the effluent of step (b) and determining the sulphur content of the hydrocarbon fraction, and
(d) obtaining the final hydrocarbon product from the direct product of step (c) and comparing the sulphur content as determined in step (c) with the desired sulphur content of the hydrocarbon product and adjusting the process to achieve that the sulphur content of the hydrocarbon product is close or equal to the desired sulphur content of the hydrocarbon product, wherein the production of the hydrocarbon product having the desired sulphur content is optimised by integrated control of the blending in step (a) and of the HDS unit operation in step (b), and wherein the sulphur content of the hydrocarbon fraction as determined in step (c) is taken into account.

It has been found that with the process according to the invention a better-controlled process is obtained to prepare low-sulphur gas oil products. Due to the improved process control and process line-up it has been possible to optimise, for example, the low-sulphur gas oil production. A further advantage is that no blending farm is required. The hydrocarbon fraction, which is obtained as direct product of step (c) forms the hydrocarbon product, either directly or after accumulation in a storage vessel. Below, a more detailed description of this invention will be given including some preferred embodiments. Further advantages of the invention will become clear from said description.

Although the process of the present invention is suitably used for any process to prepare low-sulphur products, for example motor gasoline, it is especially directed to a process to prepare a gas oil product. Gas oil products, also referred to in the United States of America as diesel products, are further characterized by a % volume recovered at 250° C. of suitably less than 65% (V/V), a 95% point of suitably lower than 360° C., a Cetane Index of suitably greater than 40 or greater than the corresponding Cetane Number, a cloud point of suitably less than 0° C., a poly aromatics hydrocarbon content of suitably below 11% (m/m) and a flash point of suitably above 55° C. Although frequently specific reference is made to gas oil in the below description, it must be understood that the teachings as disclosed below also apply to the production of other low-sulphur refinery products according to the spirit of the present invention.

Starting materials for the process are at least two or more hydrocarbon feedstocks having a sulphur content above 0.05 wt %. In addition, other feedstocks such as low-sulphur hydrocarbon feedstocks and additives can be used.

In step (a) the two or more hydrocarbon feedstocks having a sulphur content above 0.05 wt % are blended. Preferably three or more and more preferably four or more of those high-sulphur feedstocks are blended in step (a). The advantages of the present process are even more achieved when such a higher number of high-sulphur feedstocks are blended in step (a). When such a high number of feedstocks is used the method of optimising the total process will become more complex. It has been found that with the below described preferred control methods an improved optimisation can be achieved.

Examples of feedstocks to be used in step (a) are typically produced in a refinery at various sources: kerosene fractions, straight run gas oil, vacuum gas oil, gas oil as obtained in a thermal cracking process and light and heavy cycle oil as obtained in a fluid catalytic cracking unit. The kerosene fraction according to the present invention has an initial boiling point (IBP) of between 160 and 180° C. and a final boiling point (FBP) of between 220 and 260° C. The straight run gas oil fraction is the gas oil fraction, which has been obtained in the atmospheric distillation of the crude petroleum refinery feedstock. It has a IBP of between 180 and 280° C. and a FBP of between 320 and 380° C. The vacuum gas oil is the gas oil fraction as obtained in the vacuum distillation of the residue as obtained in the above referred to atmospheric distillation of the crude petroleum refinery feedstock. The vacuum gas oil has an IBP of between 240 and 300° C. and a FBP of between 340 and 380° C. The thermal cracking process also produces a gas oil fraction, which may be used in step (a). This gas oil fraction has an IBP of between 180 and 280° C. and a FBP of between 320 and 380° C. The light cycle oil fraction as obtained in a fluid catalytic cracking process will have an IBP of between 180 and 260° C. and a FBP of between 320 and 380° C. The heavy cycle oil fraction as obtained in a fluid catalytic cracking process will have an IBP of between 240 and 280° C. and a FBP of between 340 and 380° C. These feedstocks will have a sulphur content of above 0.05 wt %. The maximum sulphur content will be about 2 wt %.

In the process according to this invention the various high-sulphur feedstocks from the various refinery sources are blended in step (a). Any surplus feedstock that cannot be directly used in step (a) can either be used as feed for a refinery hydroconversion unit, for example a fuels hydrocracker unit or a fluid catalytic cracking unit, or can be temporarily stored in a storage vessel. The content of this storage space, which can comprise one or more storage vessels, can be used as blending component at a later moment. Preferably at least two storage vessels are used, wherein one storage vessel is used to store any surplus cycle oil and the remaining storage vessels can be used for, optionally mixtures, of the remaining hydrocarbon feedstocks. Cycle oils are preferably kept apart from the other feedstocks.

Step (b) is suitably performed in a state of the art HDS unit. In such a unit the blended feed mixture is contacted in a reactor with a suitable HDS catalyst in the presence of hydrogen. The sulphur components react to $H_2S$, which is easily removed together with other light components in a work-up and fractionation section of the HDS-unit from the effluent of the HDS reactor. The catalyst is suitably a heterogeneous catalyst comprising a carrier, a Group VIB metal and a non-noble Group VIII metal. Examples of suitable catalysts are nickel-molydenum on alumina or cobalt-molybdenum on alumina catalysts. Possible HDS processes are described in Handbook of Petroleum Refining Processes, Robert A. Meyers Editor in Chief, $2^{nd}$ edition, McGraw Hill, pages 8.29-8.38.

In step (b) an additional catalytic dewaxing of the gas oil product may be advantageously performed in order to lower the pour point and/or cloud point of the gas oil product. Preferably, the catalytic dewaxing is performed after the HDS step has been performed. More preferably, the HDS steps and the catalytic dewaxing steps are performed in one reactor vessel, wherein the different catalysts are present in a series of stacked beds. Suitable dewaxing catalysts will comprise a molecular sieve, a binder and a Group VIII metal, suitable a non-noble metal such as nickel or cobalt. The molecular sieve material is typically a medium pore size molecular sieve having a pore diameter in the range of from 0.35 to 0.80 nm. Examples of suitable molecular sieves are ZSM-11, ZSM-12, ZSM-22, ZSM-23, ZSM-35, ZSM-38, ZSM-48, ZSM-57, SSZ-23, SSZ-24, SSZ-25, SSZ-26, SSZ-32, SSZ-33 and MCM-22. Preferred molecular sieves are ZSM-5, ZSM-12 and ZSM-23. The binder is preferably a low acidity refractory oxide binder material, which is essentially free of alumina, suitably silica. The surface of the aluminosilicate zeolite crystallites, as exemplified above, is preferably modified by subjecting the crystallites to a surface dealumination treatment. Such a dewaxing catalyst, its preparation and its use in gas oil dewaxing is further described in WO-A-0029512.

In step (c) the effluent of step (b) is suitably mixed with a hydrocarbon feedstock having a sulphur content of below 0.05 wt %, provided such a low-sulphur hydrocarbon feedstock is available in the specific refinery. For example, refineries comprising also a fuels hydrocracker will produce a gas oil feedstock in said hydrocracker, which has a lower sulphur content than 0.05 wt %. Further examples of such feedstock are a hydrotreated kerosene fraction, fatty acid methyl ethers, and fuel fractions as obtained from the product of a Fischer-Tropsch reaction. It is advantageous to blend these low-sulphur fractions to the effluent of step (b) rather than blend them with the high-sulphur fractions in step (a) for obvious reasons.

When Fischer-Tropsch derived gas oil is added, this is suitably obtained from the (hydrocracked) Fischer-Tropsch synthesis product. Examples of Fischer-Tropsch derived gas oils are described in EP-A-583836, WO-A-011116, WO-A-011117, WO-A-0183406, WO-A-0183648, WO-A-0183647, WO-A-0183641, WO-A-0020535, WO-A-0020534, EP-A-1101813, U.S. Pat. No. 5,888,376 and U.S. Pat. No. 6,204,426.

Suitably the Fischer-Tropsch derived gas oil will consist of at least 90 wt %, more preferably at least 95 wt % of iso and linear paraffins. The weight ratio of iso-paraffins to normal paraffins will suitably be greater than 0.3. This ratio may be up to 12. Suitably this ratio is between 2 and 6. The actual value for this ratio will be determined, in part, by the hydroconversion process used to prepare the Fischer-Tropsch derived kerosene or gas oil from the Fischer-Tropsch synthesis product. Some cyclic-paraffins may be present.

The Fischer-Tropsch derived gas oil will suitably have a cetane number of higher than 60 and preferably above 70 and a distillation curve which will for its majority be within the typical gas oil range: between about 150 and 400° C. The Fischer-Tropsch gas oil will suitably have a T90 wt % of between 340-400° C., a density of between about 0.76 and 0.79 g/cm3 at 15° C., and a viscosity between about 2.5 and 4.0 centistokes at 40° C.

Preferably, additives are added to the effluent of step (b) in step (c). Examples of gas oil additives are additives which boost cetane number, adjust electrical conductivity, depress cold flow properties like CFPP (cold filter plugging point), pour point and/or improve Colour, Lubricity.

The sulphur content of the hydrocarbon fraction as obtained in step (c) is determined. This can be done by means of an on-line analyzer or by means of off-line measurements measured for instance by means of XRF (X ray fluorescence) or UVF (Ultra violet fluorescence). Alternatively use can be made of near infrared measurement methods to determine the sulphur content as for example described in GB-A-2303918. Also, a model based quality estimator can be used for determining the sulphur content, as will be described in more detail below.

In step (d) the sulphur content as determined in step (c) is compared with the desired sulphur content. If the determined sulphur content in step (c) and the desired sulphur content of the resulting final gas oil product differ too much, the process will need to be adjusted. Adjusting the process comprises integrated control of the blending in step (a) and of the HDS unit operation in step (b). The integrated control will be described in more detail below, and suitably comprises adjusting the operating conditions of the HDS unit in step (b) and adjusting the properties of the blended feed mixture by changing the composition of the blended feed mixture as obtained in step (a). The optional addition of low-sulphur hydrocarbon feedstock in step (c) can also be adjusted.

Adjusting the process operating conditions on the HDS unit of step (b) is suitably performed by making use of a model-based controller, such as for example a multivariable controller, in particular the well-known MPC (Multivariable Predictive Controller) controller. Process conditions, which are manipulated in order to achieve the desired sulphur content, are for example the feed rate of the blended feed mixture to the HDS unit, the hydrogen recycle and the temperature profile in the HDS reactor. The temperature profile in the HDS reactor can be influenced by adjusting the feed inlet temperature or by adjusting the amount of quench mixture as added to the reactants between two of the catalyst beds of the HDS reactor. The quench mixture may advantageously be part of the blended feed mixture as obtained in step. (a). In this control loop the relevant constraints of the HDS unit are of course taken into account. Preferably the MPC controller maximizes the feed rate to the HDS unit, provided that the sulphur content of the final gas oil product is close to or equal the desired sulphur content.

The sulphur content as determined in step (c) is preferably the sulphur content of the gas oil fraction after any low-sulphur feedstocks have been added. This is advantageous because it is the sulphur content of the final gas oil fraction of step (c), i.e. the direct product of step (c), which will determine the sulphur content of the final gas oil product, i.e. the hydro-carbon product. If, for example, a great volume of low-sulphur blending feedstocks is temporarily available to be blended with the gas oil effluent of step (b), the required reduction of sulphur in the HDS step (Step (b)) can be relaxed (i.e. less reduction of sulphur required) such that after blending the sulphur content in the direct product of step (c) remains close to the desired value. This can result in that more blended feed mixture can be processed in step (b) or alternatively that more of the high-sulphur gas oil feedstocks, like cycle oils, can be part of the blended feed mixture as prepared in step (a).

The final gas oil product will have a sulphur content close or equal to the desired sulphur content. With close is here preferably meant within 10 ppm (0.001 wt %) and more preferably within 5 ppm of the desired sulphur content. The desired sulphur content will be a value of below 0.05 wt %, preferably below 0.01 wt % and more preferably below 0.005 wt %, and will be dependent on the product specifications which may be different for different market situations. The desired sulphur content will typically be a value of greater than 0.0005 wt % (5 ppm). It is clear that this lower boundary may even become lower when more tight government regulations come into force.

The final gas oil product can be the direct gas oil fraction as obtained in step (c). Hereby is meant that in a certain time period the sulphur content of the gas oil fraction as obtained in step (c) will be continuously equal or close to the desired sulphur content. Examples in which this is required are when the fraction as obtained in step (c) is directly transported to a product pipeline or when said fraction is loaded into a transport means, such as a ship or train.

The gas oil fraction of step (c) may alternatively be first accumulated and stored in a storage vessel. In such a situation it is important that the sulphur content of the mixture in the storage vessel, after being filled to a predetermined level, is equal or close to the desired sulphur content. The properties of this final gas oil product in the storage vessel can be derived by calculating the average properties of the feed, i.e. the effluent of step (c), which are fed in time to said storage vessel, and the quality of any material which resides in the storage vessel at the beginning of the run. Thus in this situation the comparison in step (d) of the determined sulphur content of step (c) and the desired sulphur content of the final gas oil product is performed by first estimating the sulphur content of the gas oil already present in the storage vessel based on said average sulphur content based on the determined sulphur content in step (c), and secondly comparing said sulphur content estimation of the gas oil in the vessel with the desired sulphur content. In such a situation it will be less important that the sulphur content of the hydrocarbon (gas oil) fraction as obtained in step (c) remains constantly close to the desired sulphur content while being fed to said storage vessel. The process control even allow the sulphur content of the hydrocarbon fraction to exceed the desired sulphur content of the hydrocarbon product for a certain period of time, if this is compensated by lower sulphur contents of the mixture already in the storage vessel or of the later produced hydrocarbon fractions. This means that the process has more flexibility to arrive at the desired final and stored gas oil product.

Preferably the estimation of the sulphur content of a partly filled storage vessel is used to adjust the required sulphur content (the "controlled variable") as will be determined in step (c). For example, if the sulphur content of the product already in the storage vessel is below the desired sulphur specification the required sulphur content of the effluent of step (c) may be relaxed (i.e. a higher sulphur content). This manner of using an estimation of the quality of the storage tank and using said estimation to either relax or tighten the required sulphur reduction in step (b), composition of the blended feed mixture in step (a) and/or influence the blending of low-sulphur feedstock in step (c), further reduces the chance of the above referred to product give-away (i.e. a higher quality than required).

Typically there is a significant and varying dead time between the HDS unit-operating conditions in step (b) and a sulphur analyzer response on the hydrocarbon fraction as obtained in step (c). Because of this dead time the response time after which the HDS unit is adjusted by the MPC due to for example a change in feed composition, will be high. This results in for example off-spec products or a non-optimized gas oil production. For this reason it is preferred to make use of a model based quality estimator for determining the sulphur content of the fraction in step (c). The performance of the MPC will be improved when the sulphur content as predicted by the model based quality estimator is used as the so-called "controlled variable" in the MPC instead of a measured analyzer signal as described above. Such a model based quality estimator will need additional information in order to predict the sulphur content. Such additional information can be the sulphur content of the blended feed mixture as obtained in step (a), the sulphur content of the low-sulphur feedstock, which may be added in step (c) and the HDS unit operating conditions, for example hydrogen partial pressure, average reactor temperature and/or the earlier referred to HDS operating conditions.

In addition to the determination of the sulphur content in the fraction as obtained in step (c) a model-based estimator can also be advantageously used to predict some other of the remaining relevant gas oil properties of said fraction. Examples of such properties are the earlier referred to Cetane Index, Cetane number, Cloud Point, Cold Filter Plugging Point (CFPP), Flash Point, Pour Point, Density, Viscosity, Colour, Lubricity, electrical Conductivity, total Aromatics content, Di+-aromatics content, Poly Aromatics Content, and distillation temperature for 90%, 95%, or 100% recovery, distillation curve, sulphur species distribution according to boiling point range, and Nitrogen content. Such a model based quality estimator will preferably use as input the properties of the blended feed mixture, the HDS operating conditions and/or the nature and volume of the fractions and additives added in step (c). Preferably the estimated properties are used in a more advanced control method as will be explained below. In case the final gas oil product is obtained in a final storage vessel the remaining and relevant other gas oil properties of said stored product can also be estimated as explained for sulphur. These estimations of the properties of the stored gas oil product can be used in a more advanced control method as will be explained below.

Model based quality estimators are well known and are for example described in Viel F., Hupkes W., Inferred Measurement, Hydrocarbon Engineering, April 2001, pages 73-76. Such model based quality estimators are preferably calibrated from time to time. Calibration is preferably performed making use of the real and validated measurement of the property, which is estimated by the quality estimator. Calibration is normally performed under steady state conditions in order to compare the real and validated values with the estimated values. Under non-steady state conditions such a comparison would be difficult to perform if a considerable dead time exists as explained above. Applicants have now found a method, which overcomes these problems making it possible to calibrate the model-based estimator (QE) on-line under non-steady state conditions. This so-called Robust Quality Estimator (RQE) is preferably used in the process according to the present invention. The new method of this RQE will be explained in more detail below (see for example FIG. 3-4). The real and validated measurement may be a laboratory analysis or more suitably by means of an on-line analyser which can be using near infrared (NIR)or nuclear magnetic resonance (NMR) spectrographic methods.

In step (a), the blending ratio of the high-sulphur feedstocks is controlled in order to obtain a blended feed mixture. This ratio will preferably be chosen such that a certain sulphur specification of the blended feed mixture in step (a) is met while one or more other properties of the blended feed mixture, of the effluent of step (b), of the hydrocarbon fraction of step (c) and/or ultimately of the final hydrocarbon product are within a desired specification. Such an other property can be Cetane Index, Cetane number, Cloud Point, Cold Filter Plugging Point (CFPP), Flash Point, Pour Point, Density, Viscosity, Colour, Lubricity, electrical Conductivity, total Aromatics content, Di+-aromatics content, Poly Aromatics Content, and distillation temperature for 90%, 95%, or 100% recovery, distillation curve, sulphur species distribution according to boiling point range, and Nitrogen content.

The sulphur content can be measured in step (a). More preferably, blending in step (a) is controlled by making use of a model based quality estimation of the sulphur content in the blended feed mixture. This blending operation, based on the sulphur content of blended feed mixture may still lead to a possible give-away. (i.e. a higher quality than required) in the remaining above cited gas oil properties. To reduce the above described give-away and increase the robustness of the operation a so-called and well-known Blend Property Controller (BPC) is suitably used in step (a). A Blend Property Controller will allow to optimize the blend recipe in terms of desired properties and at minimum costs based on the properties of the different blending components (i.e. the hydrocarbon feedstocks used in step (a)) and the economic value of said blending components. The BPC will control the blending process based on the quality (sulphur content and/or one or more of the other properties) of the blended feed mixture as obtained in step (a). These properties may be directly measured or estimated by means of a model based quality estimator, more preferably by means of the cited Robust Quality Estimator. The input for the estimation models as used by the quality estimator will preferably be the blending ratios, the property blending rules and properties and/or blending indices of the various feedstocks being used in step (a). The properties of the various feedstocks can be measured on-line or off-line. A preferred method of measuring the different properties is by use of NIR as for example described in GB-A-2303918 and EP-A-555216.

The model based quality estimator will have to be calibrated from time to time to compensate for model inaccuracy or drift. The real and validated values of the properties, which are estimated by the model-based estimator, can be measured by means of off-line laboratory sampling or by means of an off-line semi-automatic NIR/NMR analyser. Preferably advanced Statistical Process Control techniques are applied to check whether the quality estimator has to be updated. In a more preferred embodiment the above-cited RQE is used to estimate the properties of the blended feed mixture.

It has been found, that the above described control scheme comprising a MPC and BPC control loop, optionally in combination of a (R)QE, will provide a suitable control only, when there is integration between the control of BPC and MPC. In the described control scheme, the sulphur content is controlled by the MPC while the other properties are controlled by the BPC. If there was no integrated control, conflicts between MPC and BPC could occur. Suitably, the integrated control comprises a global reconciliation layer (e.g. rules on top of MPC and BPC)to provide for a solution for these conflicts. Without a global reconciliation layer, for example, the MPC may reduce the HDS intake to ensure that the sulphur specification is met when dynamic constraints are met by the HDS. However, from an economic view point, it could well be that in such a specific situation it would have been more advantageous to adjust the mixed HDS feed composition in order to help the MPC to achieve sulphur control while keeping the HDS maximum intake. A global reconciliation layer avoids that such sub-optimal control solutions take place.

More preferably the control of both the blending operation and the HDS unit is incorporated into one extended MPC controller, which optimises both the blending operation in step (a), the HDS process in step (b) and optionally also the final product blending in step (c). Suitably, the economic profit is thereby maximised. An example of a suitable extended MPC controller is the Shell Multivariate and Optimiser Controller (SMOC) as described in more detail in Marquis P., Broustail J. P., SMOC, a bridge between State Space and Model Predictive Controllers, Application to the automation of a hydrotreating unit, IFAC Model Based Process Control, Georgia, USA, 1988, pages 37-45. In such a control configuration the extended MPC will control the, sulphur content and preferably one or more of the remaining gas oil properties of the fraction obtained in step (c) (i.e. the "controlled variables") instantaneously by manipulating the blending operation in step (a), optionally the blending of effluent of step (b) with low sulphur hydrocarbon feedstocks in step (c) and the control of the HDS unit in step (b) as described above. The extended MPC will also optimize the total process in economic terms by maximizing the overall non-linear profit function ("Max Profit"), comprising on-line tuneable coefficients for the components/product prices per weight or volume unit ("$component_i"):

Max Profit=Product_flowrate*$product−Sum of (Component_i_flowrate*$component_i)

Wherein "Product_flowrate" is the flow rate of the finished product in step (c), in terms of weight or volume per time period; "$ product" is the value of the finished product using the same terms as for "$component_i"; "Component_i_flowrate" is the flow rate of hydrocarbon feedstock in step (a), and optionally (c), in the same terms as for the "Product_flowrate". Maximising the profit function is equivalent to minimising the cost function, which latter can be represented by the sum term in the above equation.

Preferably the sulphur and one or more of the other gas oil properties of the hydrocarbon fraction as obtained in step (c) and said properties of the blended feed mixture as obtained in step (a) are supplied to the extended MPC as an estimated quality. A model based quality estimator, more preferably the cited Robust Quality Estimator; is used to estimate the gas oil quality (properties).

The invention will now be illustrated by making use of FIGS. 1-4.

FIG. 1 describes the state of the art HDS line-up.

Figure 1:
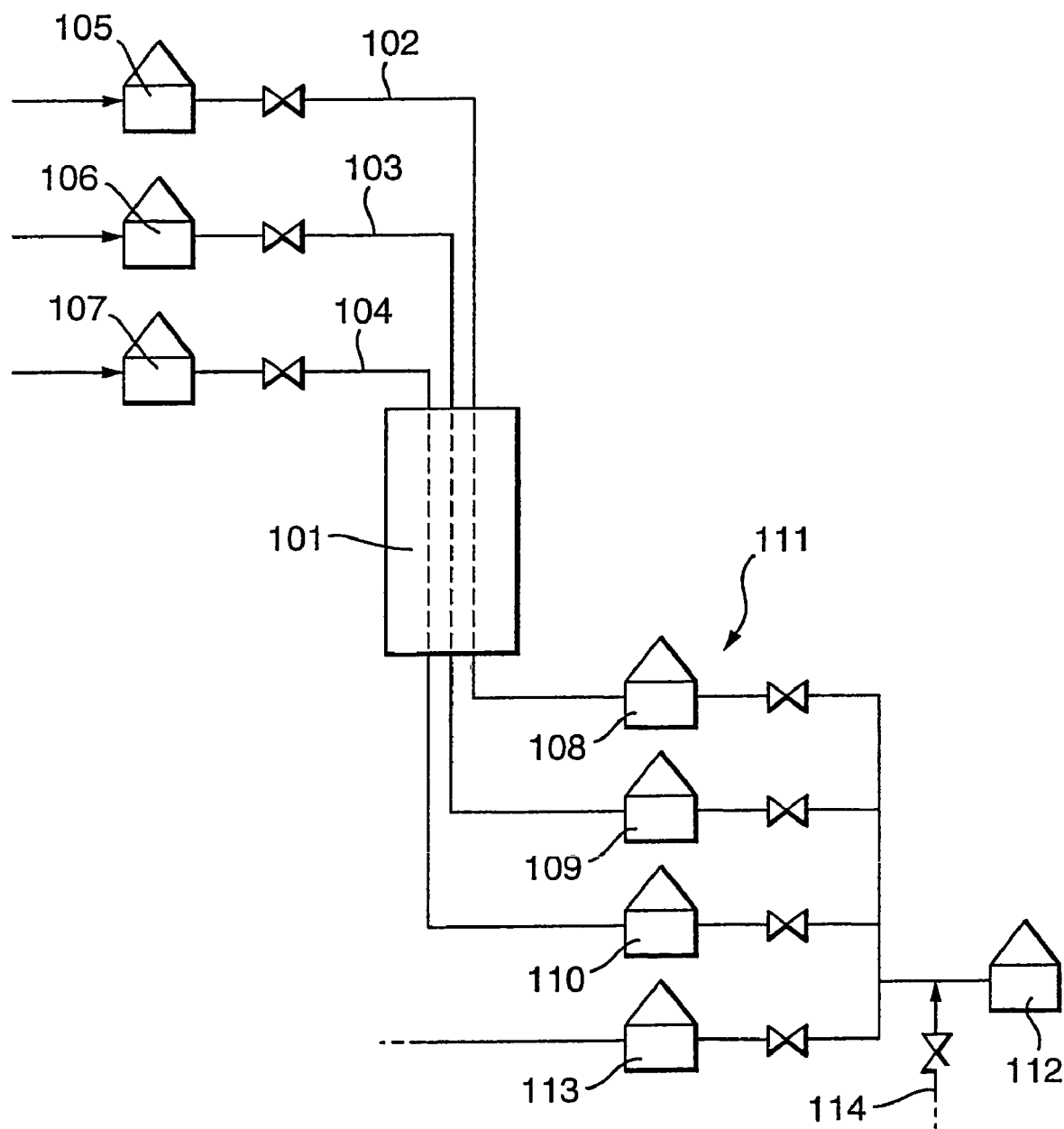

FIG. 1 shows the state of the art HDS operation. To the HDS unit (101) various feeds (102, 103, 104) are fed. These feeds are stored in storage vessels (105, 106, 107). Such storage is located between the source of the various hydrocarbon feedstocks (not shown) and the HDS unit (101). The products of the HDS unit are stored in different vessels (108, 109, 110) of the blending farm (111). By storing low sulphur HDS products separate from the relatively higher sulphur content HDS products it is possible to blend a gas oil product, as stored in vessel (112) having the desired specification. The blending farm (111) may also comprise a storage vessel (113) for low-sulphur hydrocarbon feedstocks, which are not a product of the HDS unit. Additives are added to the final gas oil product by means of an on-line additive injection (114).

Figure 2:
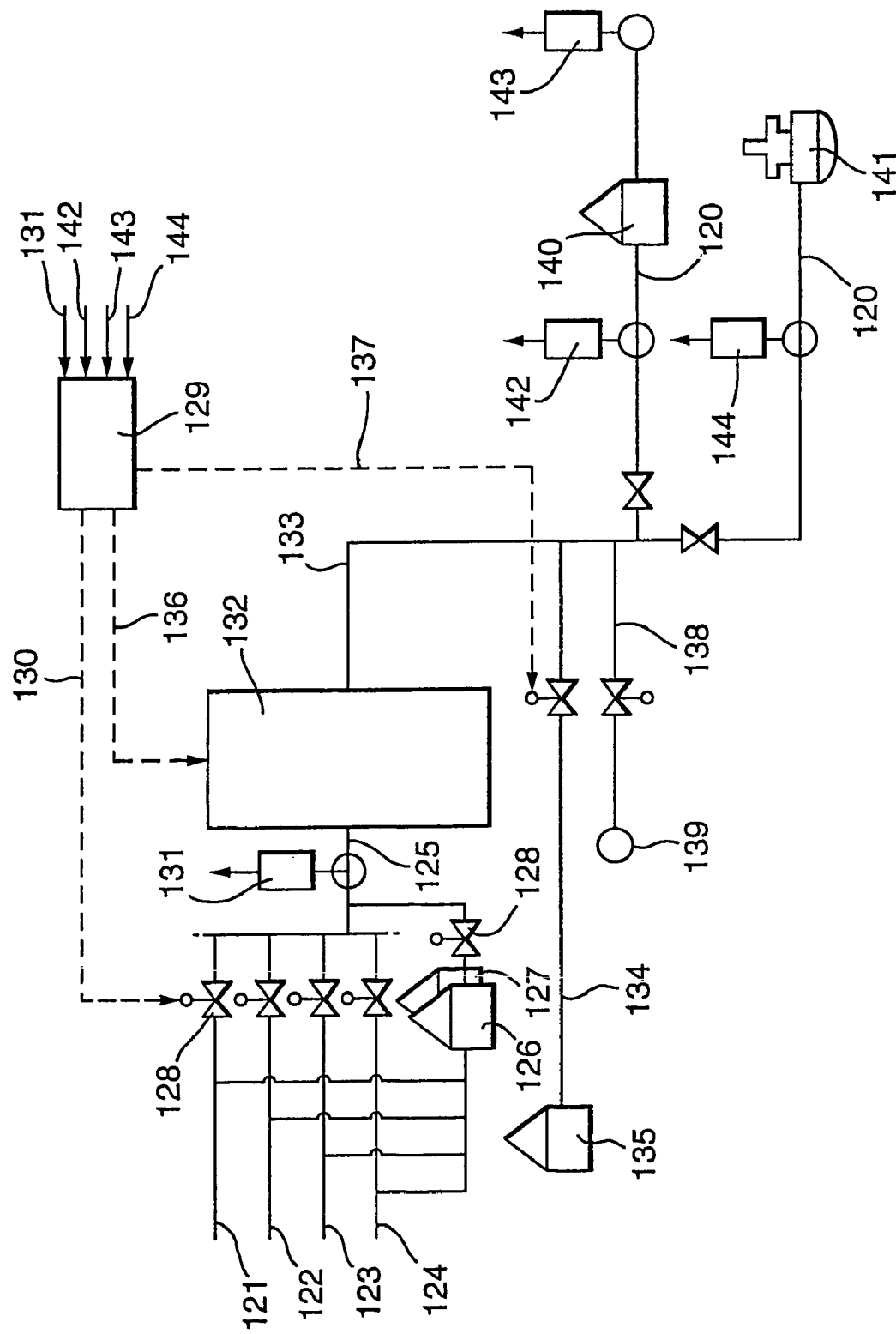
FIG. 2 illustrates an embodiment of the present invention with a preferred control scheme.

FIG. 2 illustrates a preferred embodiment of the present invention. FIG. 2 shows a process to continuously prepare a gas oil product (120) having a desired sulphur content. The process as illustrates starts from a kerosene feedstock (121), a straight run gas oil feedstock (122), a vacuum gas oil feedstock (123) and a cycle oil feedstock (124), all having a sulphur content of above 0.05 wt %. According to step a) of the method of the present invention, a selected mixture of these feedstocks is formed to obtain a blended feed mixture (125). Any surplus feedstock can be temporarily stored in storage vessels (126, 127). Part of the earlier stored feedstock may be part of the blended feed mixture (125). The blending operation is operated by making use of valves (128), which valves are controlled by the Extended Model Process Controller (129) via control line (130). In order to control the blending operation the quality of the blended feed mixture (125) is estimated making use of a Robust Quality Estimator (131). The estimated quality is at least the sulphur content and preferably one or more of the other gas oil properties.

In step b) of the methods, the sulphur content of the blended feed mixture is reduced in the HDS unit (132). The operating conditions of the HDS unit (132) are controlled via (136) by the Extended Model Process Controller (129) such that a sufficient sulphur reduction is obtained in this unit (132) for obtaining a final gas oil product (120) having the desired sulphur and remaining properties.

In step c) of the method, to the effluent (133) of the HDS unit (effluent of step (b)) a low-sulphur gas oil feedstock (134) as obtained in a hydrocracker is added. This feedstock is fed from a separate feedstock storage vessel (135). The rate of gas oil feedstock (134) is controlled by the Extended Model Process Controller (129) via (137). Additives are fed from one or more additive storage vessels (139) to the effluent (133) via in-line additive injector (138). The rate of adding additives may be controlled by the Controller (129) or may be controlled separately. The sulphur content, and suitably one or more other properties of the resulting hydrocarbon fraction, which is the direct product from step c), is determined after any addition of low-sulphur feedstocks and additives.

The direct product of step (c) as thus obtained may be accumulated and stored in a final gas oil product storage vessel (140) or may for example be directly loaded into a ship (141). The sulphur content and one or more of the remaining gas oil properties of the hydro-carbon fraction as obtained in step (c), as fed to said storage vessel (140), may be estimated by making use of a Robust Quality Estimator (142). These estimated values are the "controlled variables" as used by Controller (129). The properties of the gas oil product in storage tank (140) are also estimated by making use a Robust Quality Estimator (143). These estimated values are also used as input for the Controller (129). Based on these values the optimiser can adjust the set point for sulphur content (and remaining "controlled variables") of the intermediate product as fed to said storage vessel (140).

In a situation wherein the quality of the product of step (c) should be continuously close to the desired quality of the final gas oil product, as is the situation when ship (141) is loaded, the above RQE (143) will not be used. The quality of the feed to the ship will then be estimated by making use of RQE (144).

The RQE's shown in FIG. 2 will require input in order to make an estimation. The required input and related measurements are not shown in FIG. 2. The RQE will further be calibrated on-line by making use of real and validated measurements. The required on-line or off-line measurements are not shown in FIG. 2.

In the scheme of FIG. 2 the Controller (129) will try to optimise the HDS unit operation such that a product (120) is obtained which has properties close to or equal the desired qualities (in order to avoid product give-away) by controlling the composition of the blended feed mixture via (130), controlling the HDS unit operating conditions via (136) and controlling the amount of low-sulphur feedstock via (137). The controller will base its decisions on the estimated qualities as measured at (131), (142), (143) and (144). Further input for the Controller will be the component prices (see formula above) and the desired product properties.

The model based quality estimators, which are suitably used in the process according to the present invention, will have to be calibrated using historic quality measurements. The use of historic quality measurements is not straightforward. For example in the present process the time (dead time) between the moments that the actual measurement of a property, e.g. sulphur level of the product of step (c), becomes known and the moment of the actual measurement is relatively long. Other phenomena such as dynamics between the QE inputs (e.g. HDS conditions and HDS feed quality) and the measured qualities and a phenomenon normally referred to as changing of the process gains, i.e. a drift in the ratio between inputs and outputs should be taken into account when use is made of such historic data to calibrate the process model.

In order to combat these unwanted situations, it is customary to calibrate Quality Estimators when the process for which they are applicable is in its so-called steady-state, i.e. in the situation in which the process fluid is uniform and constant in composition, state and velocity at the entrance and at the exit of the operation. Although such calibration will give good results with respect to the system to be monitored, it is still considered to be sub-optimal because available dynamic (non-steady state) information is not used. This because calibration has to wait until the process has reached a steady operating point. Moreover the presence of a steady-state detector is required in order to know when calibration can start.

Preferably the following calibration method is used which can also be used under non-steady state conditions. Model Estimators making use of such a calibration method are referred to in this application as the Robust Quality Estimators (RQE). The RQE according to the present invention provides a more accurate and robust quality prediction, which improves the performance of the quality control scheme according to the present invention.

The improved automatic on-line calibration method comprises:

A) collecting raw process data,
B) processing data collected in step A) through the process model to obtain a prediction of the gas oil quality,
C) processing this prediction through dynamic transfer functions thus creating two intermediate signals,
D) storing the two intermediate signals obtained in step C) as a function of time in history,
E) retrieving at the time of a real and validated measurement of the gas oil quality from the history the absolute minimum and maximum value of the two intermediate signals in the time period corresponding to a minimum and maximum specified dead time, which values define the minimum and maximum prediction possible,
F) calculating the deviation as being the difference between the real and validated measurement and the area encompassed between the minimum and maximum prediction possible as obtained in step E),
G) proceeding with step I) if the absolute value of the deviation obtained in step F) is zero, or, proceeding with step H) if the absolute value of the deviation obtained in step F) is larger than zero,
H) incorporating the deviation into the process model, and
I) repeating steps A)-H).

The process model, which is calibrated with the method of the present invention, is suitably a so-called input-output parametric model, which has been obtained off-line from history process data and gas oil quality measurement. Examples of such models are Multiple Linear Regression as described in for example, Introduction to linear regression analysis by Montgomery and Peck, John Wiley & Sons, 1992, Linear Dynamic Model (in the Laplace transform Domain) as for example described in Linear Systems by Keilath, Prentice-Hall, Information & System sciences series, 1980 and Radial Bias Function Neural Network (optionally with Gaussian function) as for example described in T. Poggio and F. Girosi. Network for approximation and learning. The Proceedings of the IEEE, 78(9): pages 1485-1497, September 1990. Depending on the nature of the process model applied and the type of raw material data received, those skilled in the art will select the type of process model for the gas oil quality estimation best fitting the perceived goal.

Figure 3:
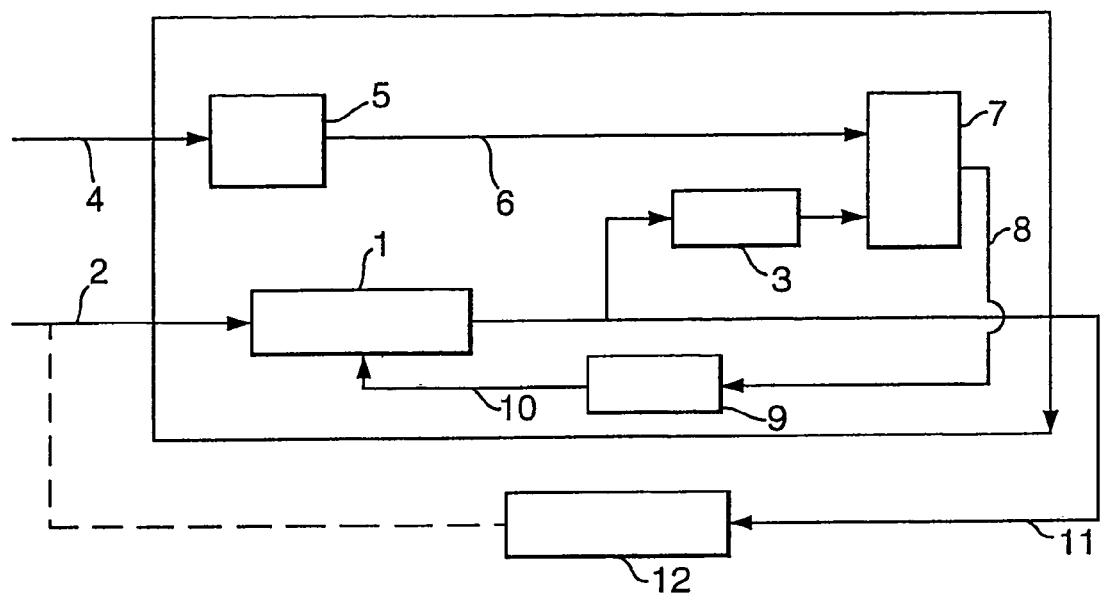
FIGS. 3-4 illustrate the Robust Quality Estimator.

FIG. 3 shows a process model (1) having input from raw process data (2). The process model (1) provides an estimated gas oil quality (11), which is used as input for controller (12), which may control for example a valve (not shown). FIG. 3 also shows a module (3) wherein steps (C) and (D) are performed. Further shown is a validation module (5), which validates the real gas oil quality measurement (4) to obtain a real and validated gas oil quality measurement (6). Based on the input from module (3) and the real and validated gas oil quality measurement (6) a deviation is calculated in (7). If the deviation is greater than zero as described in step (G) the deviation (8) is used for calibration of the process model (1), preferably by making use of the Kalman Filter (9).

The collection of raw process data (2) in step (A) to be used in the method according to the present invention can be carried out by methods known in the art. It is customary in process control technology to measure data (2) at a number of points over a period of time. For instance, in refining operations, operating parameters such as temperature, pressure and flow are normally measured at frequent intervals, or even in a continuous manner and they can be stored and processed in many ways as is known to those skilled in the art.

In order to get a prediction of the gas oil quality (11) out of the raw process data (2) collected the above referred to process model (1) will be used in step (B). Step (B) is thus the gas oil quality prediction step.

Step (C) is an essential step in the method for automatic on-line calibration. This and further steps will also be illustrated by making use of FIG. 4. In these steps the calculation of the minimum, and maximum prediction possible at the time of the real and validated measurement(s) of the gas oil quality is performed. Step (C) is suitably performed by applying two dynamic transfer functions (so-called uncertain dynamics) to the prediction of the gas oil quality (11) (the undelayed real time), thus creating two intermediate signals. Dynamic transfer functions are well known tools to one skilled in the art and are for example described in Linear Systems by Keilath, Prentice-Hall, Information & System sciences series, 1980. In step (D) these intermediate signals (20, 21) are stored as a function of time in history. This will result in essence in an (uncertainty) area (22) in which the actual process response should be placed and which will become very narrow when reaching the steady-state situation (23, 24). It is also possible that the uncertainty area (22), in a non-steady state situation, is reduced to a line corresponding to the event in which the independent dynamic transfer functions are identical (this situation is not shown in FIG. 4). The so-called minimum and maximum prediction possible are obtained by calculating from the history the absolute minimum (27) and maximum values (28) of these two intermediate signals (20, 21) in the time period corresponding to a minimum (25) and maximum (26) specified dead time. The dead time is a function of the virtual location of the gas oil quality estimator relative to the location where the real gas oil quality is measured, time for the real gas oil quality to be measured and other process conditions, for example flow rate and liquid hold-up. The dead time can be easily determined by one skilled in the art. From this input a maximum (26) and minimum (25) dead time is defined representing the time period of the process history in which in step (F) the real and validated gas oil quality measurement (29->29') is compared with the predicted gas oil quality area (22) and the specific minimum (27) and maximum (28) possible gas oil quality values.

Before reaching the steady-sate situation, the area (22) can be very wide. The state of the art systems will either only calibrate during steady-state or have the risk of making a false calibration in case the real and validated measurement(s) of the gas oil quality is within the above mentioned area. The method according to the present invention, however, is specifically designed to calibrate only when the real and validated measurement(s) (29) of the gas oil quality are outside the uncertainty area (22), thus preventing instabilities in closed-loop. Advantageously the calibration method according to the present invention can be performed under steady and non-steady state conditions.

In step (E) in the method according to the present invention part of the calibration process is carried out by calculating the deviation (30) (the so-called prediction error) as being the distance between the real and validated measurement (29') and the area (22) encompassed between the minimum (27) and maximum (28) prediction possible as obtained from the earlier calculation.

The real and later validated measurement (29) of the gas oil quality can be an on-line or off-line measurement of the gas oil quality. Examples of the gas oil quality and the possible measurement techniques, including NIR and/or NMR, have been discussed above.

Figure 4:
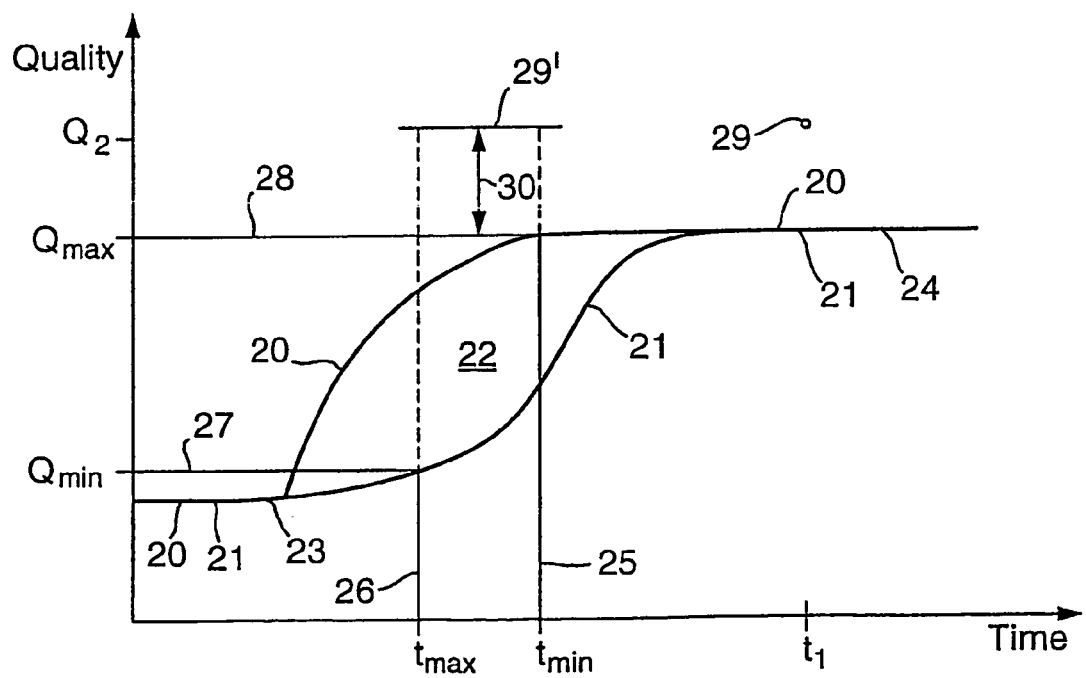

In step (G) the usefulness for calibration purposes of the real and validated measurement of the gas oil quality is determined. Only measurements (29') of the gas oil quality, which are outside the uncertainty area (22), can be used for calibration of the model. In other words, if the calculation of the deviation (30) as described herein above shows that the absolute value of the deviation obtained is zero, meaning that the validated and real measurement of the gas oil quality is within the uncertainty area (22) or more precise, between the minimum (27) and maximum (28) possible gas oil quality values, the deviation (30) found will not be used as further input in the calibration process but the system will continue by repeating the steps carried out up till now as there is no need to refine the system. If, however, the deviation (30) as calculated shows that the absolute value of the deviation (30) is larger than zero, as shown in FIG. 4, the deviation (30) obtained will be incorporated into the process model in step (H) and the previous steps will be repeated (step I). The net result will be the generation of a modified, more precise, predictive process model, which will then serve as the basis for further modifications depending on the level of deviations being observed during the course of the calibrating process.

Preferably step (H) is performed, such that incorporation of the deviation (8) into the process model (1) is performed with the use of a Kalman filter (9)(See FIG. 3). The result of performing step (H) in such a manner will be that the deviation can be incorporated into the process model by adjusting its linear parameters thereby updating the prediction band and improving the process model. The use of a Kalman filter is well known in the art of process control operations. Reference is made in this respect to "Stochastic Processes and Filtering Theory" by Jazwinski (Academic Press, Mathematics and Science and Engineering, Vol. 64, 1970). Since Kalman filters are in essence optimal stochastic filters they also filter out, or even eliminate, the noise on the measured gas oil quality, which makes them very suitable for use in the method according to the present invention.

It should be noted that the use of Kalman filters is not limited to calibration operations, which are carried out under non steady-state conditions, as it is equally capable of providing useful information when a process is being operated under steady-state conditions.

It has been found that by combining the Kalman filter with the process according to the present invention an even more robust control method is obtained. The use of Kalman filter has the additional advantage that it will keep improving the accuracy of the gas oil quality estimation process. In the event that no real and validated measurement of the gas oil quality is received, calibration as defined in steps E, F and G is not carried out. The system will repeat steps A-D until a further real and validated measurement of the gas oil quality is received.

We claim:

1. A process to prepare a hydrocarbon product having a desired sulphur content, which the desired sulphur content is a specified value lower than 0.05 wt %, which process comprises the steps of:
   (a) blending at least two high-sulphur hydrocarbon feedstocks, wherein each of the at least two high-sulphur hydrocarbon feedstocks contains sulphur in an amount above 0.05 wt %, to form a blended feed mixture having a blended feed sulphur content;
   (b) reducing the blended feed sulphur content of the blended feed mixture by operation and use of a hydrodesulphurisation (HDS) unit to yield an effluent having a hydrotreated sulphur content;
   (c) mixing the effluent with a low-sulphur hydrocarbon feedstock having a low-sulphur content that is below 0.5 wt % to obtain a hydrocarbon fraction, having a reduced sulphur content, and determining the reduced sulphur content of the hydrocarbon fraction; and
   (d) comparing the reduced sulphur content as determined in step (c) with the desired sulphur content for the hydrocarbon product to provide a differential value and adjusting the process in response to the differential value in order to provide the hydrocarbon fraction having the reduced sulphur content that is close or equal to the desired sulphur content wherein the process is adjusted by integrated control of the blending in step (a) and of the HDS unit operation in step (b) to thereby provide the hydrocarbon fraction that is suitable as the hydrocarbon product.

2. The process according to claim 1, wherein a Multivariable Predictive Controller is used for the integrated control in step (d).

3. The process according to claim 2, wherein the blended feed sulphur content of the blended feed mixture as obtained in step (a) is taken into account in the integrated control of the process.

4. The process according to claim 3, wherein in the integrated control also account is taken of at least one property, other than the sulphur content, of a fluid selected from the group consisting of the blended feed mixture, the effluent of step (b), and the hydrocarbon fraction.

5. The process according claim 4, wherein the integrated control of the process is arranged so as to optimize the at least one other property of the hydrocarbon product, other than the sulphur content, so that the at least one other property of the hydrocarbon product is close or equal to a desired quality of the hydrocarbon product.

6. The process according to claim 5, wherein the at least one other property is selected from the group of properties consisting of the Cetane Index, the Cetane number, the Cloud Point, the Cold Filter Plugging Point, the Flash Point, the Pour Point, the Density, the Viscosity, the Colour, Lubricity, the electrical Conductivity, the total Aromatics content, the Di+-aromatics content, the Poly Aromatics Content, and the distillation temperature for 90%, 95%, or 100% recovery, the distillation curve, the sulphur species distribution according to the boiling point range, and the Nitrogen content.

7. The process according to claim 6, wherein the integrated control also controls the addition of an additive to the hydrocarbon fraction in step (c).

8. The process according to claim 7, wherein the integrated control also controls the addition in step (c) of the low-sulphur hydrocarbon feedstock to the effluent of step (b).

9. The process according to claim 8, wherein the low-sulphur hydrocarbon feedstock is selected from the group consisting of a gas oil fraction as obtained from a fuels hydrocracker, a hydrotreated kerosene fraction, fatty acid methyl ethers, and fuel fractions as obtained from the product of a Fischer-Tropsch reaction.

10. The process according to claim 9, wherein a model based quality estimator is used for determining a sulphur property selected from the group consisting of the blended feed sulphur content, the hydrotreated sulphur content of the effluent of step (b), the reduced sulphur content the hydrocarbon fraction, the at least one other property as recited in claim 6 of the blended feed mixture, or of the effluent of step (b), or of the hydrocarbon fraction.

11. The process according to claim 10, wherein the model based quality estimator is a self-calibrating quality estimator, which is capable of calibration under steady state and non-steady state conditions.

12. The process according to claim 11, wherein the model based quality estimator is calibrated on line by making use of real and validated measurements of the sulphur property using an off-line or on-line X-ray fluorescence analytical technique or an off-line or on-line Ultra violet fluorescence analytical technique to obtain the sulphur property.

13. The process according to claim 12, wherein the determination of the sulphur content and/or of the at least one other property is performed by making use of a model based quality estimator.

14. The process according to claim 13, wherein the process is adjusted in step (d) so as to maximise a profit function ("Max Profit", in terms of value/time), wherein the profit function is represented by the following equation Max Profit=Product_flowrate*$product−Sum of (Component_i_flowrate*$component_i), wherein "Product_flowrate" is the flow rate of the hydrocarbon fraction in step (c), in terms of weight or volume per time;

"$product" is the value of the hydrocarbon product per weight or volume unit; and "Component_i_flowrate" is the flow rate of a feedstock component i in terms of weight or volume per time, wherein the feedstock component includes the at least two high-sulphur hydrocarbon feedstocks used in step (a) or (c), or the additive used in step (c), "$component_i" is the price of component i per weight or volume, and wherein the summation is carried out over all feedstock components.

15. The process according to claim 14, wherein the hydrocarbon product is a gas oil product.

16. The process according to claim 15, wherein the at least two high-sulphur hydrocarbon feedstocks used in step (a) comprise two or more refinery sources chosen from the list of a kerosene fraction, a straight run gas oil fraction, a vacuum gas oil fraction, a gas oil fraction as obtained in a thermal cracking process and a light or heavy cycle oil as obtained in a fluid catalytic cracking process.

17. The process according to claim 16, wherein step (b) is performed in the presence of hydrogen and a heterogeneous catalyst comprising a carrier and a Group VIB metal and a non-noble Group VIII metal.

18. The process according claim 17, wherein in step (b) next to the hydrodesulphurisation step also a catalytic dewaxing step is performed.

19. The process according to claim 11, wherein the calibration is performed by

A) collecting raw process data;
B) processing data collected in step A) through the process model to obtain a prediction of the gas oil quality;
C) processing this prediction through dynamic transfer functions thus creating two intermediate signals;
D) storing the two intermediate signals obtained in step C) as a function of time in history;
E) retrieving at the time of a real and validated measurement of the gas oil quality from the history the absolute minimum and maximum value of the two intermediate signals in the time period corresponding to a minimum and maximum specified dead time, which values define the minimum and maximum prediction possible,
F) calculating the deviation as being the difference between the real and validated measurement and the area encompassed between the minimum and maximum prediction possible as obtained in step E);
G) proceeding with step I) if the absolute value of the deviation obtained in step F) is zero, or, proceeding with step H) if the absolute value of the deviation obtained in step F) is larger than zero;
H) incorporating the deviation into the process model; and
I) repeating steps A)-H).

20. The process according to claim 1, wherein the blended feed sulphur content of the blended feed mixture as obtained in step (a) is taken into account in the integrated control of the process.

21. The process-according to claim 1, wherein in the integrated control also account is taken of at least one property, other than the sulphur content, of a fluid selected from the group consisting of the blended feed mixture, the effluent of step (b), and the hydrocarbon fraction.

22. The process according to claim 21, wherein the integrated control of the process is arranged so as to optimize the at least one other property of the hydrocarbon product, other than the sulphur content, so that the at least one other property of the hydrocarbon product is close or equal to a desired quality of the hydrocarbon product.

23. The process according to claim 22, wherein the at least one other property is selected from the group of properties consisting of the Cetane Index, the Cetane number, the Cloud Point, the Cold Filter Plugging Point, the Flash Point, the Pour Point, the Density, the Viscosity, the Colour, Lubricity, the electrical Conductivity, the total Aromatics content, the Di+-aromatics content, the Poly Aromatics Content, and the distillation temperature for 90%, 95%, or 100% recovery, the distillation curve, the sulphur species distribution according to the boiling point range, and the Nitrogen content.

24. The process according to claim 1, wherein the integrated control also controls the addition of an additive to the hydrocarbon fraction in step (c).

25. The process according to claim 1, wherein the integrated control also controls the addition in step (c) of the low-sulphur hydrocarbon feedstock to the effluent of step (b).

26. The process according to claim 21, wherein a model based quality estimator is used for determining a sulphur property selected from the group consisting of the blended feed sulphur content, the hydrotreated sulphur content of the effluent of step (b), the reduced sulphur content the hydrocarbon fraction, the at least one other property of the blended feed mixture, of the effluent of step (b), or of the hydrocarbon fraction.

27. The process according to claim 10, wherein the model based quality estimator is calibrated on line by making use of real and validated measurements of the sulphur content using an off-line or on-line X-ray fluorescence analytical technique or an off-line or on-line Ultra violet fluorescence analytical technique to obtain the sulphur content measurement.

28. The process according to claim 1, wherein the process is adjusted in step (d) so as to maximize the profit function ("Max Profit", in terms of value/time), wherein the profit function is represented by the following equation Max Profit=Product_flowrate*$product_Sum of (Component_i_flowrate*$component_i), wherein "Product_flowrate" is the flow rate of the hydrocarbon fraction in step (c), in terms of weight or volume per time;

"$product" is the value of the hydrocarbon product per weight or volume unit; and "Component_i_flowrate" is the flow rate of a feedstock component i in terms of weight or volume per time, wherein the feedstock component includes the at least two high-sulphur hydrocarbon feedstocks used in step (a) or (c), or the additive used in step (c). "$componenti" is the price of component i per weight or volume, and wherein the summation is carried out over all feedstock components.

29. The process according to claim 1, wherein the hydrocarbon product is a gas oil product.

30. The process according to claim 1, wherein the at least two high-sulphur hydrocarbon feedstocks used in step (a) comprise two or more refinery sources chosen from the list of a kerosene fraction, a straight wn gas oil fraction, a vacuum gas oil fraction, a gas oil fraction as obtained in a thermal cracking process and a light or heavy cycle oil as obtained in a fluid catalytic cracking process.

31. The process-according to claim 1, wherein step (b) is performed in the presence of hydrogen and a heterogeneous catalyst comprising a carrier and a Group VIB metal and a non-noble Group VIII metal.

32. The process according to claim 1, wherein in step (b) next to the hydrodesulphurisation step also a catalytic dewaxing step is performed.

* * * * *